(12) United States Patent  (10) Patent No.: US 9,306,200 B2
Naganuma  (45) Date of Patent: Apr. 5, 2016

(54) BATTERY HOLDING DEVICE (75) Inventor: Atsuhiro Naganuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1619 days.

(21) Appl. No.: 12/578,589

(22) Filed: Oct. 14, 2009

(65) Prior Publication Data

US 2010/0151307 A1  Jun. 17, 2010

(30) Foreign Application Priority Data

Dec. 12, 2008 (JP) ................. 2008-317100

(51) Int. Cl.
H01M 10/6557 (2014.01)
H01M 10/6556 (2014.01)
H01M 10/6552 (2014.01)
H01M 10/6571 (2014.01)
H01M 2/10 (2006.01)
H01M 10/625 (2014.01)
H01M 10/615 (2014.01)
H01M 10/647 (2014.01)
H01M 10/6555 (2014.01)
H01M 10/613 (2014.01)
H01M 10/0525 (2010.01)
H01M 10/34 (2006.01)

(52) U.S. Cl.
CPC .......... *H01M 2/1072* (2013.01); *H01M 10/613* (2015.04); *H01M 10/615* (2015.04); *H01M 10/625* (2015.04); *H01M 10/647* (2015.04); *H01M 10/6555* (2015.04); *H01M 10/6557* (2015.04); *H01M 10/6571* (2015.04); *H01M 10/0525* (2013.01); *H01M 10/345* (2013.01); *Y02T 10/7011* (2013.01)

(58) Field of Classification Search
None
See application file for complete search history.

(56) References Cited

U.S. PATENT DOCUMENTS

| 2001/0046624 | A1* | 11/2001 | Goto et al. ...................... 429/99 |
| 2006/0210868 | A1* | 9/2006 | Kim et al. ..................... 429/120 |
| 2007/0190405 | A1* | 8/2007 | Kang et al. ..................... 429/99 |
| 2008/0160395 | A1* | 7/2008 | Okada et al. ................... 429/99 |
| 2008/0213652 | A1* | 9/2008 | Scheucher ....................... 429/62 |

FOREIGN PATENT DOCUMENTS

| JP | 2004-063397 | 2/2004 |
| JP | 2006-269426 | 10/2006 |

* cited by examiner

Primary Examiner — Yoshitoshi Takeuchi
(74) Attorney, Agent, or Firm — Mori & Ward, LLP (57) ABSTRACT A battery holding device is configured to hold a capacitor including at least one storage cell and includes a cell holder and a heater wire. The cell holder is provided at a side surface of at least one storage cell and has a concave-convex surface facing the at least one storage cell. The concave-convex surface has a protrusion contacting the at least one storage cell. At least a portion of the heater wire is embedded in the cell holder.

17 Claims, 8 Drawing Sheets

BATTERY HOLDING DEVICE

CROSS-REFERENCE TO RELATED APPLICATIONS

The present application claims priority under 35 U.S.C. §119 to Japanese Patent Application No. 2008-317100, filed Dec. 12, 2008. The contents of this application are incorporated herein by reference in their entirety.

BACKGROUND OF THE INVENTION

1. Field of the Invention

The present invention relates to a battery holding device.

2. Discussion of the Background

A capacitor that supplies electrical power to, for example, a motor is installed in a vehicle such as an electric vehicle (EV) or a hybrid electrical vehicle (HEV). A plurality of storage cells that are connected in series are provided in the capacitor. For the storage cells, secondary batteries, such as nickel metal hydride batteries or lithium-ion batteries, are used. The output characteristics of such secondary batteries depend upon temperature, and are reduced when the temperature is low. Therefore, when a vehicle (such as an EV or a HEV) in which a capacitor including a secondary battery is installed is used in a cold region, particularly, during the winter, a predetermined output may not be obtained because a sufficient amount of electrical power is not supplied to the motor from the capacitor.

Figure 9:
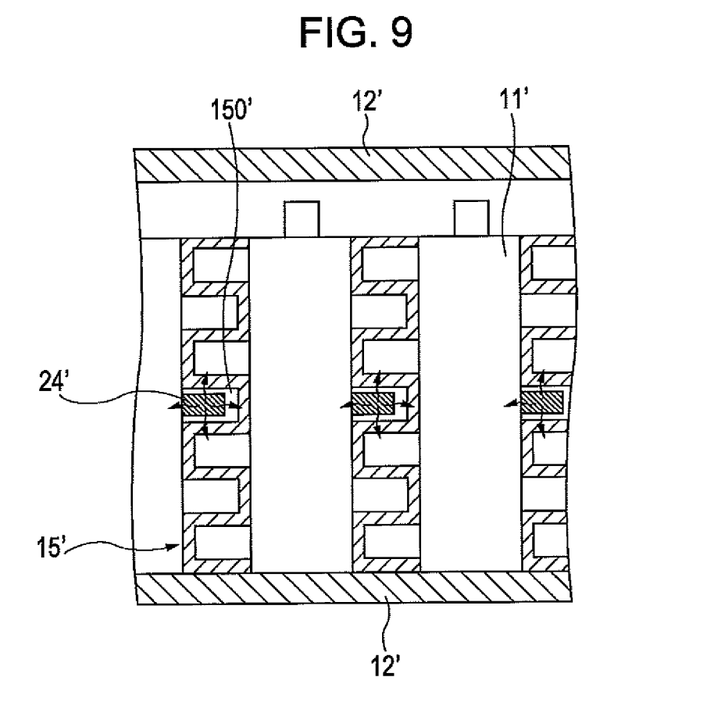
FIG. 9 shows a secondary battery module discussed in DISCUSSION OF THE BACKGROUND.

To overcome this problem, as shown in FIG. 9, a secondary battery module discussed in Japanese Unexamined Patent Application Publication No. 2006-269426 includes a PTC heater 24' between a division wall 15' and an electric cell 11' in a housing 12' having the electric cell 11' built therein. The PCT heater 24' generates heat by receiving electrical power supplied from a generator or a lead storage battery, provided in an automobile, and heats air flowing into the housing 12'.

Figure 10:
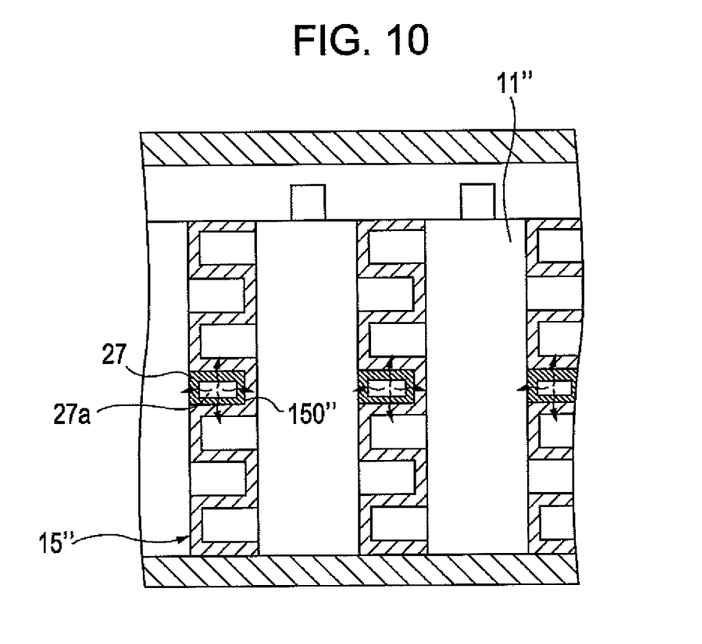
FIG. 10 shows the secondary battery module discussed in DISCUSSION OF THE BACKGROUND.

As shown in FIG. 10, Japanese Patent Application Publication (KOKAI) No. 2006-269426 discusses a secondary battery module in which a PTC heater 27 is brought into contact with an electric cell 11" and is disposed in a recessed portion 150" of a division wall 15". In this secondary battery module, the PTC heater 27 is in close contact with the division wall 15" without providing an interval therebetween. For this reason, a through hole 27a for air flow is provided in the PTC heater 27.

Figure 11:
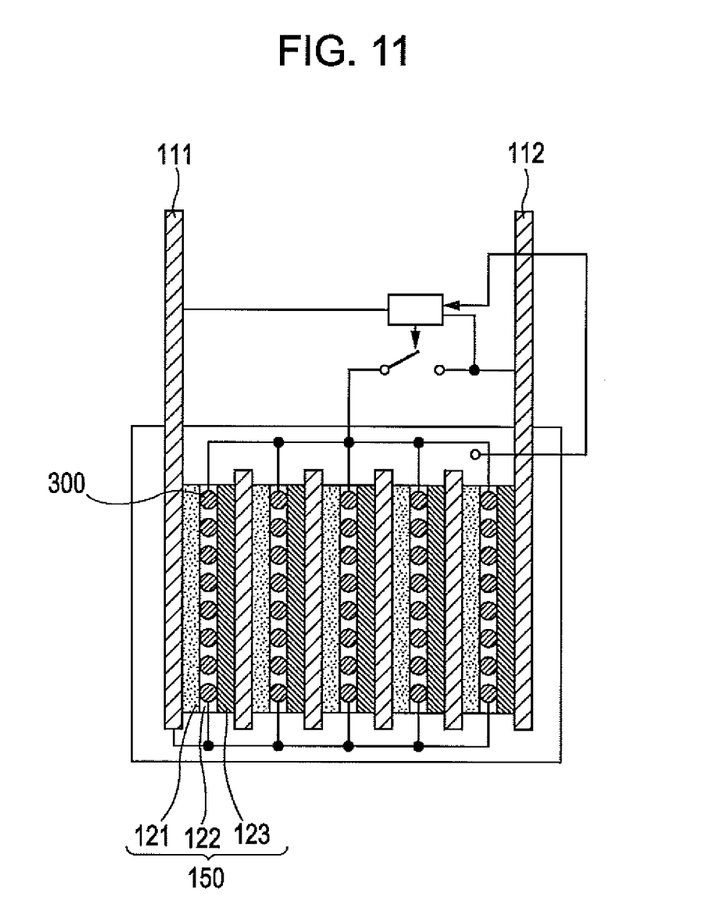
FIG. 11 shows a battery discussed in DISCUSSION OF THE BACKGROUND.

In a battery discussed in Japanese Patent Application Publication (KOKAI) No. 2004-063397, as shown in FIG. 11, a heater section 300 is embedded in an electrolytic layer 122 of a bipolar battery including a positive-pole active material layer 121, the electrolytic layer 122, and a negative-pole active material layer 123, which are arranged side by side in that order. The heater section 300 generates Joule heat while electrical current flows to a negative-pole external terminal 112 from a positive-pole external terminal 111 through the heater section 300. As a result, the battery is heated by the Joule heat that is internally generated.

In the secondary battery module discussed in Japanese Patent Application Publication No. 2006-269426 discussed above, the PTC heater 24' is provided between the electric cell 11' and the division wall 15', and the PTC heater 27 is provided between the electric cell 11" and the division wall 15". In the secondary battery modules, when cooling the electric cells 11' and 11", cooling air is blown to a space between the division wall 15' and the electric cell 11' that is not occupied by the PTC heater 24' or the through hole 27a of the PTC heater 27, respectively. However, when the number of PTC heaters is increased to increase a heating range of the batteries 11' and 11" by the respective PTC heaters 24' and 27, the cooling air may not flow adequately.

Although Japanese Patent Application Publication No. 2004-063397 discussed above discusses increasing the temperature of the battery by the heater section 300, it does not discuss cooling the battery by causing cooling air to flow between a plurality of bipolar batteries.

SUMMARY OF THE INVENTION

According to one aspect of the present invention, a battery holding device is configured to hold a capacitor including at least one storage cell and includes a cell holder and a heater wire. The cell holder is provided at a side surface of at least one storage cell and has a concave-convex surface facing the at least one storage cell. The concave-convex surface has a protrusion contacting the at least one storage cell. At least a portion of the heater wire is embedded in the cell holder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Embodiments will now be described with reference to the accompanying drawings, wherein like reference numerals designate corresponding or identical elements throughout the various drawings. A battery holding device according to an embodiment of the present invention will hereunder be described with reference to the drawings.

Figure 1:
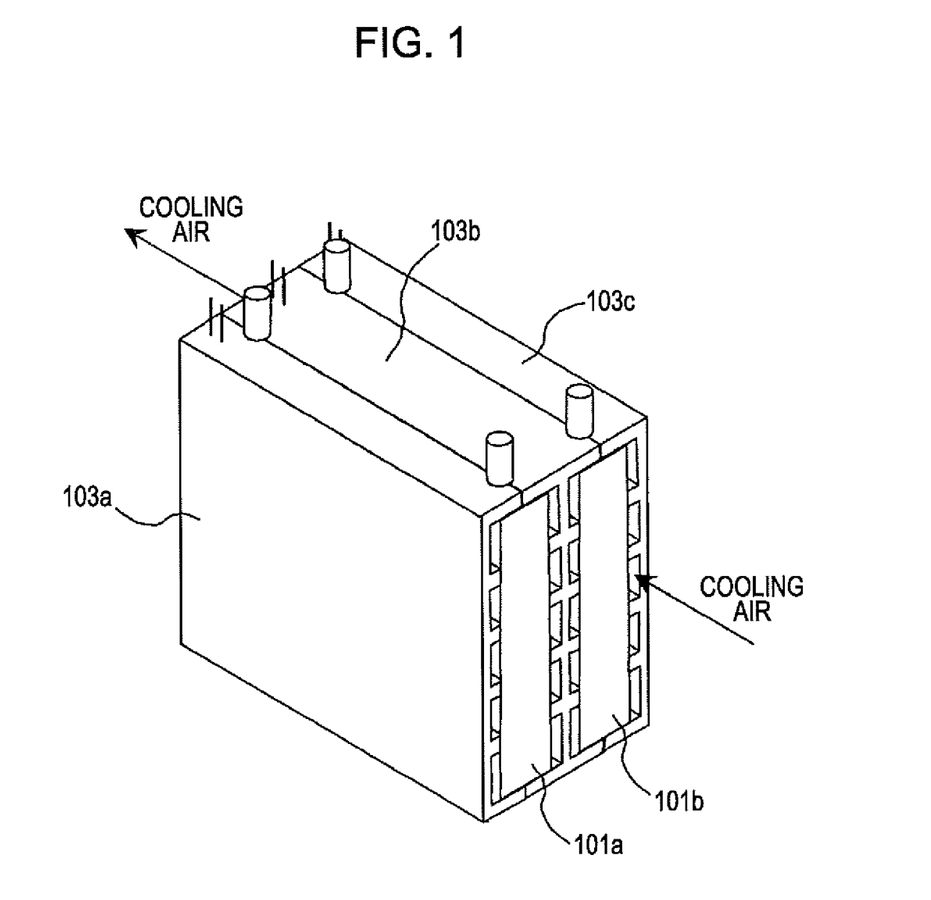
FIG. 1 is a perspective view of a battery holding device according to an embodiment of the present invention.
Figure 2:
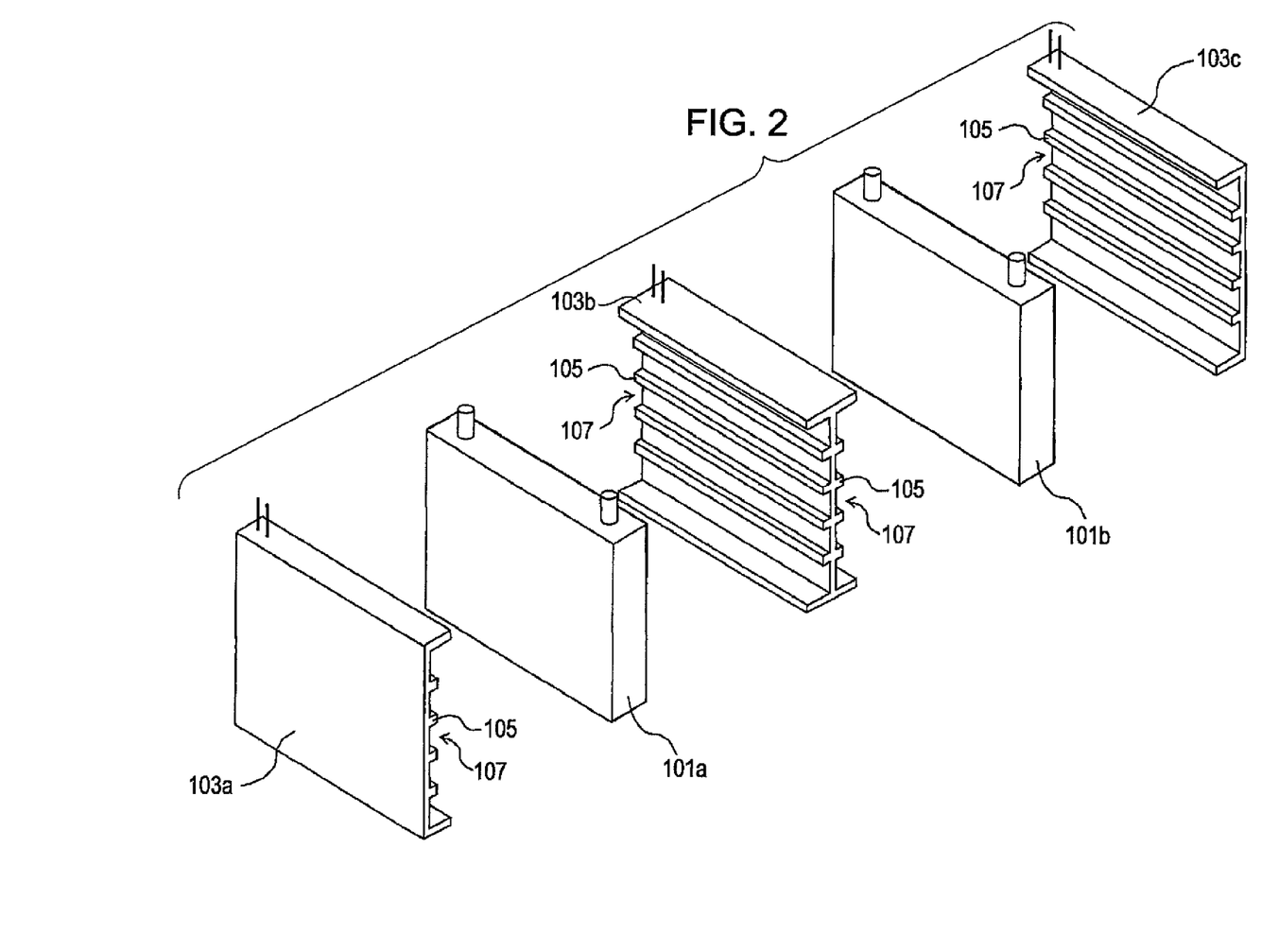
FIG. 2 is an exploded perspective view of the battery holding device shown in FIG. 1.

FIG. 1 is a perspective view of the battery holding device according to the embodiment of the present invention. FIG. 2 is an exploded perspective view of the battery holding device shown in FIG. 1. The battery holding device shown in FIGS. 1 and 2 includes cell holders 103a to 103c integrally formed with a capacitor (including two storage cells 101a and 101b) and holding the storage cells. The cell holders 103a and 103b hold the storage cell 101a, and the cell holders 103b and 103c hold the storage cell 101b. The cell holder 103b is used as a common holding member for the storage cells 101a and 101b, and provides a partition for the storage cell 101a and the storage cell 101b.

The cell holders 103a to 103c are formed of insulating materials such as resin, and their interiors are not hollow. Since the storage cells 101a and 101b are held by the cell holders 103a to 103c formed of insulating materials, the storage cells 101a and 101b do not electrically affect each other.

Surfaces of the cell holders 103a to 103c facing the storage cells are concave-convex surfaces. In the embodiment, as shown in FIG. 2, linear protrusions 105 and linear recessed portions 107 are alternately arranged side by side at the concave-convex surfaces. Surfaces of both ends of the protrusions 105 and recessed portions 107 of the cell holders 103a to 103c are not covered.

When the storage cells 101a and 101b shown in FIG. 1 are integrally formed with each other by the cell holders 103a to 103c, the protrusions 105 of the cell holders 103a to 103c contact the storage cells that they hold. In contrast, the recessed portions 107 of the cell holders 103a to 103c do not contact the storage cells. Therefore, spaces exist between the recessed portions 107 and the storage cells. As described above, since the surfaces of both ends of the protrusions 105 and the recessed portions 107 of the cell holders 103a to 103c are not covered, the spaces constitute ventilation paths for cooling air supplied from outside the battery holding device.

Figure 3:
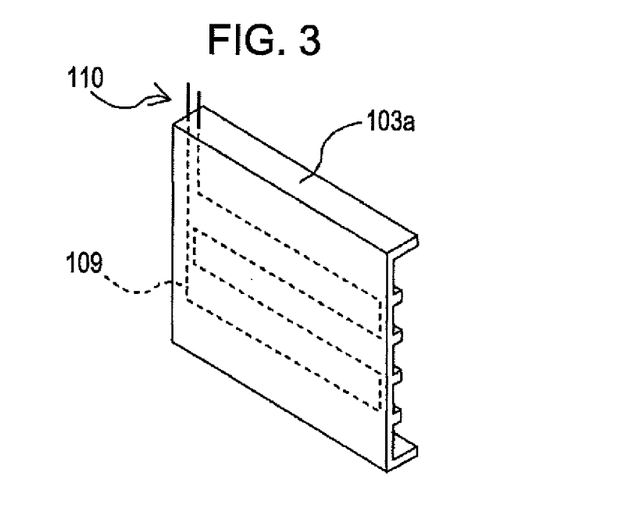
FIG. 3 shows a form of a heater wire embedded in a cell holder.

Heater wires 109 are embedded in each of the cell holders 103a to 103c. FIG. 3 shows a form of the heater wire 109 embedded in the cell holder 103a. As shown in FIG. 3, a portion of the heater wire 109 extends along one protrusion 105 formed on the concave-convex surface, bends towards another protrusion 105 near an end of the one protrusion 105, and extends along the another protrusion 105. Both ends 110 of the heater wire 109 are not embedded in the cell holder 103a. They extend out from one surface of the cell holder 103a.

Figure 4:
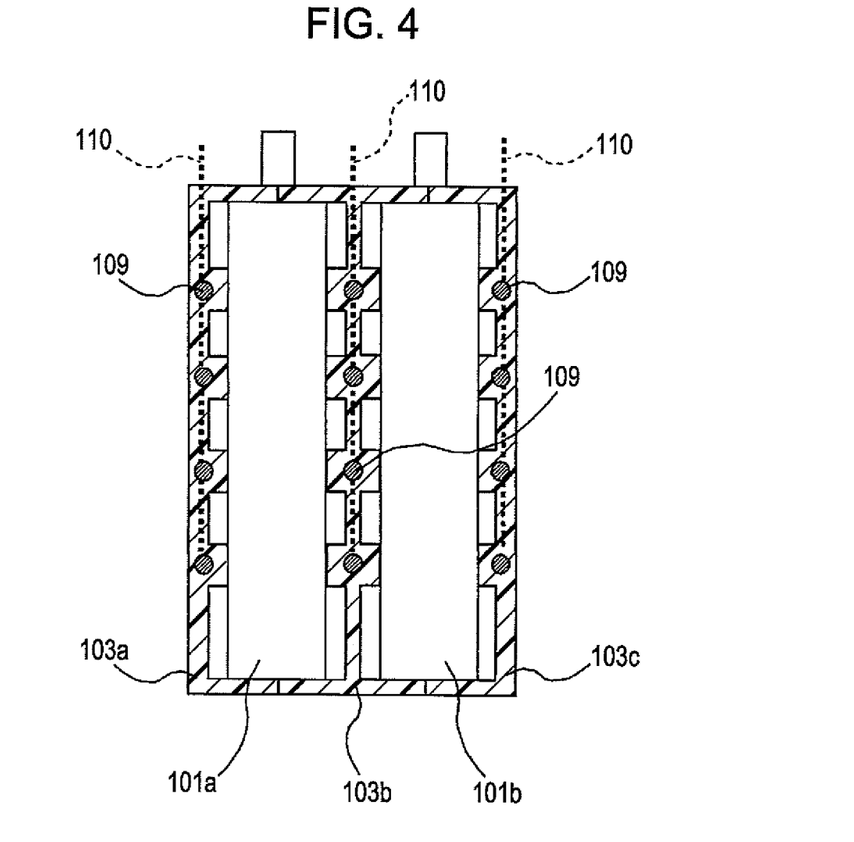
FIG. 4 is a sectional transparent view of the battery holding device shown in FIG. 1.

In the embodiment, similarly to the cell holder 103a shown in FIG. 3, the heater wires 109 are also embedded in the cell holders 103b and 103c. FIG. 4 is a sectional transparent view of the battery holding device according to the embodiment. As shown in FIG. 4, in the cell holders 103a and 103c, the heater wires extend along their respective protrusions, whereas, in the cell holder 103b, the heater wire 109 extends as a common heater wire along the protrusions on both surfaces of the cell holder 103b. The thickness of the recessed portions 107 of the cell holders 103a to 103c is larger than the diameter of the heater wires 109.

From the outside or from the storage cells 101a and 101b, electrical current is supplied to the heater wires 109, embedded in the cell holders 103a to 103c, through the both ends 110 of the heater wires 109 extending from the cell holders 103a to 103c. When the electrical current flows through the heater wires 109, heat is generated at the heater wires 109. The cell holders 103a to 103c are heated by the heat.

As mentioned above, the protrusions 105 of the cell holders 103a to 103c contact the storage cells that the cell holders 103a to 103c hold. Therefore, the heat generated from the heater wires 109 is conducted to the storage cells through the protrusions 105 of the cell holders 103a to 103c. In the embodiment, the heat generated from the heater wire 109 of the cell holder 103a is conducted along one surface of the storage cell 101a. The heat generated from the heater wire 109 of the cell holder 103b is conducted along the other surface of the storage cell 101a and one surface of the storage cell 101b. The heat generated from the heater wire 109 of the cell holder 103c is conducted to the other surface of the storage cell 101b. It is desirable that the cell holders 103a to 103c according to the embodiment be formed of materials having, not only insulating property but also high thermal conductivity.

In the embodiment shown in FIGS. 3 and 4, the heater wires 109 extend along all of the protrusions. However, the present invention is not limited thereto. The heater wires 109 may be of a form that extends along some of the protrusions. That is, there may be protrusions along which the heater wires 109 do not extend.

Figure 5:
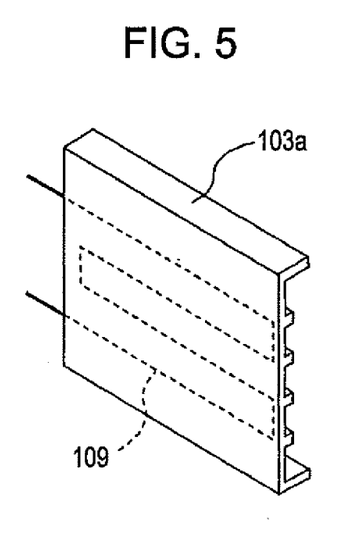
FIG. 5 illustrates another form of the heater wire embedded in the cell holder.

The surfaces where the both ends 110 of the heater wires 109 extend from the cell holders 103a to 103c are not limited to sides where electrodes of the storage cells 101a and 101b shown in FIGS. 1 to 4 are provided. For example, as shown in FIG. 5, the ends of the heater wire 109 may extend from one end side of the protrusion 105 and from one end side of the recessed portion 107, respectively.

Figure 6:
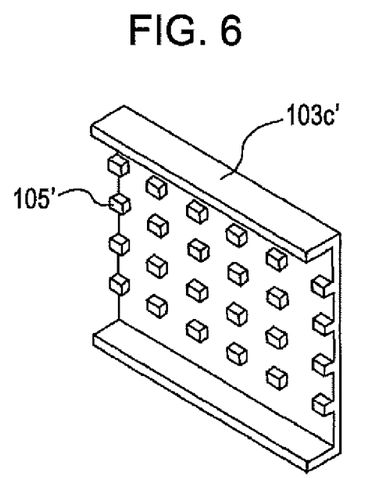
FIG. 6 is a perspective view of a cell holder having a different concave-convex surface.

The forms of the protrusions 105, formed at the concave-convex surfaces of the cell holders 103a to 103c, are not limited to linear forms. FIG. 6 is a perspective view of a cell holder 103c' having a different concave-convex surface. As shown in FIG. 6, protrusions 105' may be formed in a lattice on a surface that contacts a storage cell.

The protrusions 105 of the cell holders 103a to 103c shown in FIGS. 1 to 5 have linear forms. Therefore, although the cell holders 103a to 103c can be bent in the longitudinal direction and the vertical direction of the protrusions 105, they cannot be bent in a parallel direction. However, the cell holder 103c' shown in FIG. 6 can be bent in any of these directions. Therefore, the adhesive property of the cell holder 103c' with the storage cell 101b is good. That is, even if a contact surface of the storage cell 101b with the cell holder 103c bulges towards the cell holder 103c, the protrusions 105' contact the storage cell 101b.

As described above, the protrusions 105 are formed linearly or in a lattice on the surfaces of the cell holders 103a to 103c of the battery holding device according to the embodiment facing the storage cells 101a and 101b. In addition, the heater wires 109 extending along the protrusions 105 are embedded in the cell holders 103a to 103c. Therefore, if electrical current is made to flow to the heater wires 109 while the storage cells 101a and 101b are integrally formed with each other by the cell holders 103a to 103c, heat generated at the heater wires 109 is conducted to the storage cells 101a and 101b through the protrusions 105 of the cell holders 103a to 103c. As a result, the storage cells 101a and 101b are efficiently heated.

The spaces between the storage cells and the recessed portions 107 of the cell holders 103a to 103c constitute ventilation paths for cooling air supplied from the outside. The direction of extension of the ventilation paths is the same as the direction of extension of the heater wires 109. The heater wires 109 do not obstruct the ventilation paths, so that the ventilation paths are adequately provided. Cooling air passing through the ventilation paths directly cools the storage cells. Accordingly, the battery holding device according to the embodiment can efficiently heat and cool the capacitor including the storage cells 101a and 101b.

Since the heater wires 109 are embedded in the cell holders 103a to 103c, an assembly process for integrally forming the storage cells 101a and 101b with each other is facilitated.

Figure 7A:
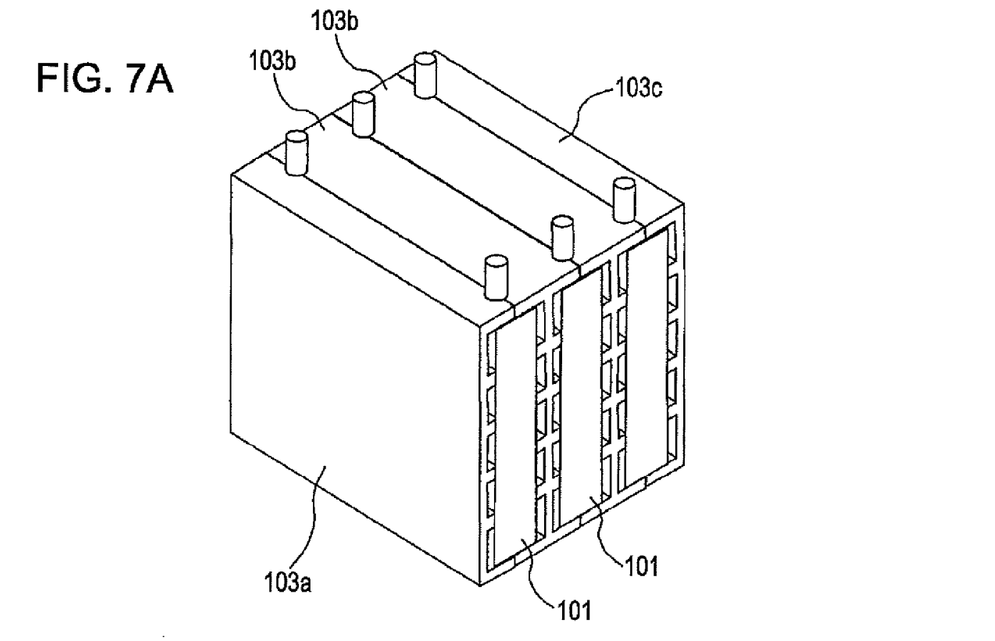
FIGS. 7A and 7B are, respectively, a perspective view of a sectional transparent view of a battery holding device holding three storage cells.
Figure 7B:
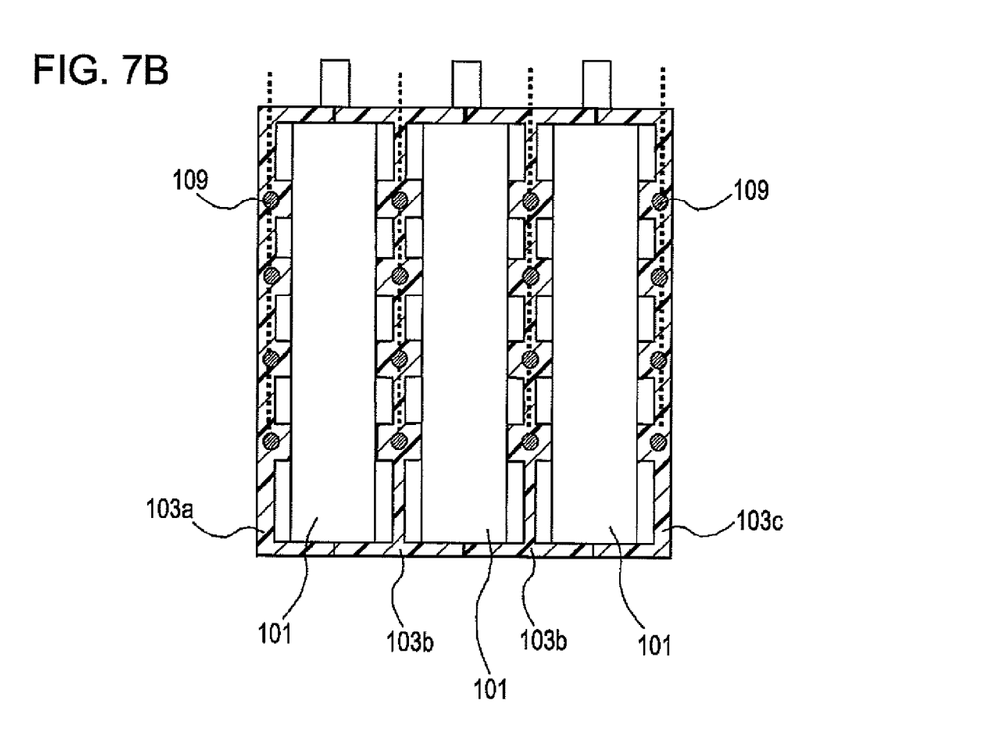

The battery holding device according to the embodiment includes three cell holders 103a to 103c for holding two storage cells 101a and 101b. However, as shown in FIGS. 7A and 7B, when three storage cells are to be held, the battery holding device includes four cell holders, that is, one cell holder 103a, two cell holders 103b, and one cell holder 103c. Accordingly, when an n number of storage cells (n is an integer greater than or equal to 1) are to be held, the battery holding device includes (n+1) cell holders, that is, one cell holder 103a, (n−1) cell holders 103b, and one cell holder 103c.

Figure 8:
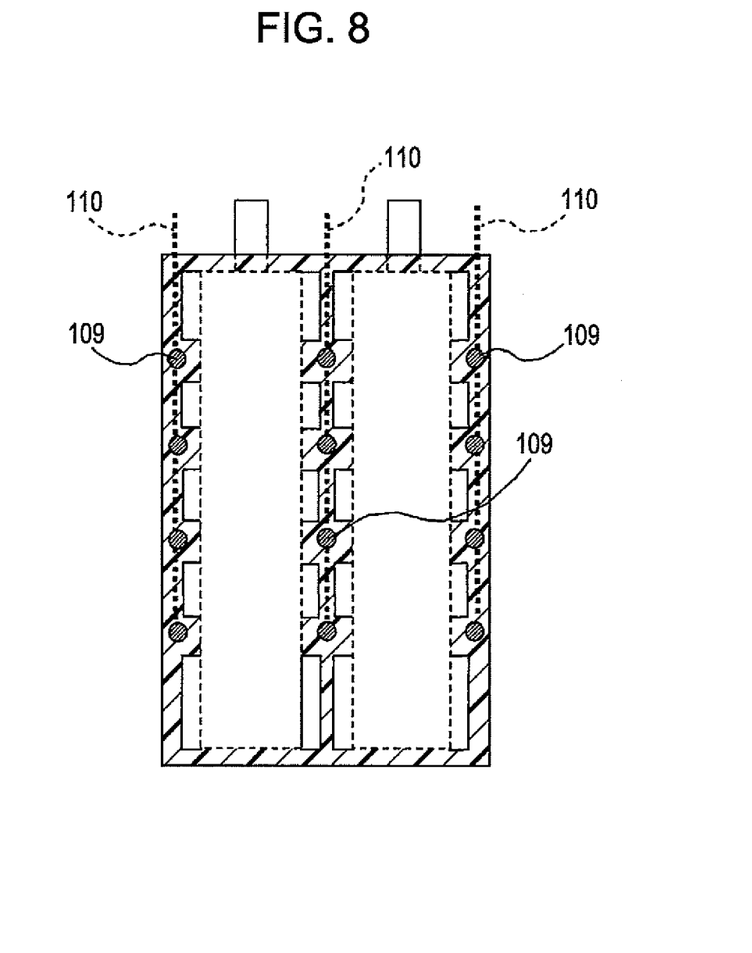
FIG. 8 is a sectional transparent view of a battery holding device having a storage cell and a cell holder integrally formed with each other.

In the embodiment, as shown in FIG. 2, the storage cells 101a and 101b and the cell holders 103a to 103c are formed as separate members. The battery holding device is formed by combining these members. However, as shown in FIG. 8, external walls of storage cells and cell holders may be integrally formed with each other. When the external walls of the storage cells and the cell holders are integrally formed with each other, thermal conductivity between the storage cells and the cell holders and working efficiency are increased.

According to an embodiment of the present invention, there is provided a battery holding device that holds a capacitor including at least one storage cell (for example, storage cells 101a, 101b in an embodiment). The battery holding device includes a cell holder (for example, cell holders 103a to 103c in the embodiment) provided at a side surface of the storage cell or between the storage cells adjacent to each other, a surface of the cell holder facing the storage cell being an concave-convex surface or surfaces of the cell holder facing the storage cells being concave-convex surfaces; and a heater wire (for example, a heater wire 109 in the embodiment) having at least a portion thereof embedded in the cell holder. The cell holder has a protrusion (for example, a protrusion 105 in the embodiment) on the concave-convex surface or each concave-convex surface, the protrusion on the concave-convex surface contacting the storage cell or the protrusion on each concave-convex surface contacting the corresponding storage cell.

According to the battery holding device of the embodiment of the present invention, it is possible to efficiently heat and cool the capacitor.

In the battery holding device, the at least a portion of the heater wire embedded in the cell holder may extend along the protrusion.

In this case, it is possible to efficiently heat the storage cell or the storage cells by heat generated at the heater wire.

In the battery holding device, a plurality of the protrusions that are linear in form and recessed portions (for example, recessed portions 107 in the embodiment) that are linear in form may be alternately provided side by side on the concave-convex surface or the concave-convex surfaces of the cell holder; and the at least a portion of the heater wire embedded in the cell holder may extend along at least two adjacent protrusions among the protrusions provided on the concave-convex surface or the concave-convex surfaces of the cell holder.

In the battery holding device, a space may be provided between the storage cell or the storage cells and recessed portions provided at the concave-convex surface or the concave-convex surfaces of the cell holder, the space constituting a ventilation path for cooling air that is supplied from outside the battery holding device.

In this case, a ventilation path for cooling air is adequately provided, and the storage cell or storage cells are directly cooled by the cooling air.

In the battery holding device, a direction of extension of the ventilation path may be the same as a direction of extension of the heater wire embedded in the cell holder and extending along the protrusions.

In this case, it is possible to efficiently heat the storage cell or the storage cells by heat generated at the heater wire. In addition, a ventilation path for cooling air is adequately provided, and the storage cell or storage cells are directly cooled by the cooling air.

In the battery holding device, the heater wire embedded in the cell holder may have a bend portion that connects ends of the heater wire extending along the adjacent protrusions.

In this case, it is possible to efficiently dispose the heater wire in the cell holder.

In the battery holding device, a thickness of the recessed portions, provided at the concave-convex surface or the concave-convex surfaces of the cell holder, may be greater than a diameter of the heater wire.

In this case, it is possible to efficiently dispose the heater wire in the cell holder.

In the battery holding device, the cell holder may be formed of an insulating material.

In this case, the storage cells do not electrically affect each other.

In the battery holding device, the storage cell or the storage cells and the cell holder are integrally formed with each other.

In this case, thermal conductivity between the storage cell and the cell holder and working efficiency are increased.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A battery holding device configured to hold a capacitor including at least one storage cell, the battery holding device comprising:
   a cell holder provided at a flat side surface of at least one storage cell and having a concave-convex surface facing the flat side surface of the at least one storage cell to allow cooling air to flow between the concave-convex surface and the flat side surface of the at least one storage cell, the concave-convex surface having a protrusion contacting the flat side surface of the at least one storage cell; and
   a heater wire at least a portion of which is embedded in the protrusion and extends along the protrusion,
   wherein the cell holder includes a planar portion, the planar portion extending from an upper surface of the at least one storage cell to a lower surface of the at least one storage cell, and the planar portion extending from a left side surface of the at least one storage cell to a right side surface of the at least one storage cell, and
   wherein the protrusion extends from the planar portion toward the flat side surface of the at least one storage cell.

2. The battery holding device according to claim 1,
   wherein the concave-convex surface includes linear protrusions and linear recessed portions, the linear protrusions and the linear recessed portions are alternately provided on the concave-convex surface, and
   wherein the at least a portion of the heater wire embedded in the cell holder extends along at least two of the linear protrusions adjacent to each other.

3. The battery holding device according to claim 2, wherein the at least a portion of the heater wire embedded in the cell holder is bent at ends of the linear protrusions adjacent to each other so that the at least a portion of the heater wire extends along the adjacent linear protrusions.

4. The battery holding device according to claim 3, wherein a thickness of the linear recessed portions is greater than a diameter of the at least a portion of the heater wire.

5. The battery holding device according to claim 1, wherein the at least one storage cell and a recessed portion of the concave-convex surface form a ventilation path to introduce cooling air from outside of the battery holding device.

6. The battery holding device according to claim 5, wherein the ventilation path and the heater wire extending along the protrusion and embedded in the cell holder extend in substantially a same direction.

7. The battery holding device according to claim 1, wherein the cell holder is formed of an insulating material.

8. The battery holding device according to claim 1, wherein the at least one storage cell and the cell holder are integrally formed with each other.

9. The battery holding device according to claim 1, wherein the capacitor includes a first storage cell and a second storage cell, and wherein the cell holder is provided between the first storage cell and the second storage cell.

10. The battery holding device according to claim 1, wherein the cell holder includes a lower wall that is configured to extend beneath, to receive, and to support the at least one storage cell.

11. The battery holding device according to claim 1, wherein the heater wire includes a section that is embedded such that an entire outer periphery of the section of the heat wire is completely covered by the cell holder.

12. The battery holding device according to claim 1, wherein the heater wire is embedded at least partially within the planar portion.

13. A battery holding device configured to hold a capacitor including at least one storage cell, the battery holding device comprising:
cell holding means for holding a flat side surface of the at least one storage cell, the cell holding means having a concave-convex surface facing the flat side surface of the at least one storage cell to allow cooling air to flow between the concave-convex surface and the flat side surface of the at least one storage cell, the concave-convex surface having a protrusion contacting the flat side surface of the at least one storage cell; and
heating means for heating the cell holding means, at least a portion of the heating means being embedded in the protrusion and extending along the protrusion,
wherein the cell holding means includes a planar portion, the planar portion extending from an upper surface of the at least one storage cell to a lower surface of the at least one storage cell, and the planar portion extending from a left side surface of the at least one storage cell to a right side surface of the at least one storage cell, and
wherein the protrusion extends from the planar portion toward the flat side surface of the at least one storage cell.

14. The battery holding device according to claim 13, wherein the capacitor includes a first storage cell and a second storage cell, and wherein the cell holding means is provided between the first storage cell and the second storage cell.

15. The battery holding device according to claim 13, wherein the cell holding means includes a lower wall that is configured to extend beneath, to receive, and to support the at least one storage cell.

16. The battery holding device according to claim 13, wherein the heating means includes a section that is embedded such that an entire outer periphery of the section of the heating means is completely covered by the cell holding means.

17. The battery holding device according to claim 13, wherein the heating means is embedded at least partially within the planar portion.

* * * * *